United States Patent
Teraoka et al.

[11] Patent Number: 5,879,259
[45] Date of Patent: Mar. 9, 1999

[54] TRANSMISSION FOR AN AUXILIARY DEVICE

[75] Inventors: Masao Teraoka; Masayuki Sayama, both of Tochigi-ken, Japan

[73] Assignee: Tochigi Fuji Sangyo Kabushiki Kaisha, Japan

[21] Appl. No.: 936,233

[22] Filed: Sep. 24, 1997

[30] Foreign Application Priority Data

Oct. 2, 1996 [JP] Japan ................................. 8-262045

[51] Int. Cl.$^6$ ................................. F02B 39/12
[52] U.S. Cl. ..................... 475/136; 475/116; 475/347
[58] Field of Search ................................. 475/116, 120, 475/140, 136, 347

[56] References Cited

U.S. PATENT DOCUMENTS

| | | | |
|---|---|---|---|
| 3,924,491 | 12/1975 | Kalversberg | 475/136 X |
| 4,261,227 | 4/1981 | Yamamori et al. | 475/136 X |
| 4,369,674 | 1/1983 | Hamane et al. | 475/347 X |
| 4,442,729 | 4/1984 | Hayakawa . | |
| 4,453,430 | 6/1984 | Sell | 475/116 |
| 4,760,757 | 8/1988 | Svab | 475/136 |
| 4,825,725 | 5/1989 | Preminski et al. . | |
| 4,958,712 | 9/1990 | Suganuma et al. . | |
| 5,004,073 | 4/1991 | Grimmm . | |
| 5,078,248 | 1/1992 | Yesnik . | |
| 5,158,508 | 10/1992 | Sakaguchi et al. | 475/347 |
| 5,346,441 | 9/1994 | Kurz et al. | 475/116 |
| 5,478,290 | 12/1995 | Buuck et al. | 475/140 |
| 5,733,218 | 3/1998 | Sudau et al. | 475/347 |

FOREIGN PATENT DOCUMENTS

| | | |
|---|---|---|
| 0 216 318 | 4/1987 | European Pat. Off. . |
| 0 365 794 | 5/1990 | European Pat. Off. . |
| 0 409 610 | 1/1991 | European Pat. Off. . |
| 523856 | 4/1931 | Germany . |
| 1 067 275 | 10/1959 | Germany . |
| 1914897 | 4/1963 | Germany . |
| 63-97425 | 4/1988 | Japan . |
| 1-204827 | 8/1989 | Japan . |
| 2041480 | 9/1980 | United Kingdom . |

*Primary Examiner*—Dirk Wright
*Assistant Examiner*—Peter T. Kwon
*Attorney, Agent, or Firm*—Graham & James LLP

[57] ABSTRACT

A transmission for an auxiliary device arranged for transmitting a driving force of an engine to an auxiliary device has a planetary-gear-type speed increasing mechanism having a first gear driven by the engine through an input shaft, a second gear connected to the auxiliary device and a third gear for locking. It is further provided with a friction clutch for connecting the third gear to a stationary member, a hydraulic actuator for pressing the friction clutch and an oil pump for feeding an oil pressure to the hydraulic actuator. A damper is disposed between the stationary member and the friction clutch.

7 Claims, 3 Drawing Sheets

TRANSMISSION FOR AN AUXILIARY DEVICE

BACKGROUND OF THE INVENTION

1. Field of the Invention

The present invention relates to a transmission for an auxiliary device for transmitting a driving force of an engine to an auxiliary device of an automotive vehicle.

2. Description of the Related Art

A transmission for an auxiliary device in accordance with the related art comprises a planetary-gear-typed speed increasing mechanism, a multiple disc clutch, a hydraulic actuator for pressing and engaging the multiple disc clutch, an oil pump for applying an oil pressure to the hydraulic actuator, a pressure adjusting valve for adjusting the oil pressure applied to the hydraulic actuator from the oil pump, a controller for adjusting an opening degree of the pressure adjusting valve so as to adjust a pressing force of the hydraulic actuator and the like, and serves to transmit the driving force of the engine to a supercharger.

A pinion carrier of the speed increasing mechanism is connected to the engine, a sun gear is connected to the supercharger and the multiple disc clutch is disposed between an internal gear and a casing of the transmission for an auxiliary device.

When the multiple disc clutch is engaged, the driving force of the engine is increased by the speed increasing mechanism so as to drive the supercharger and the driven supercharger supercharges the engine by pressurized intake air.

Generally, when the engine is in an idling state or in a low speed rotation, a rotation speed is greatly varied. As is well known, the variation of the rotation speed is particularly greater in a diesel engine than in a gasoline engine.

If the variation of the rotation speed is generated in the engine, a rattling noise of gear is generated in a timing gear set of the speed increasing mechanism or the supercharger due to a variation of a torque so that a sliding is generated in the multiple disc clutch or a press fitting portion of a gear.

Then, in the transmission for an auxiliary device, the controller monitors a torque applied to the internal gear through a torque sensor, and loosens a pressing force of the hydraulic actuator so as to slide the multiple disc clutch when a great torque is applied. Accordingly, it decreases a range of the variation of the torque by loosing a peak of the torque.

However, since the above transmission for an auxiliary device decreases the variation of the torque by sliding the multiple disc clutch, a clutch disc of the multiple disc clutch is greatly abraded by a frequent sliding so that a durability thereof is greatly lowered.

Further, in order to adjust the pressing force of the hydraulic actuator, it is necessary to provide various kinds of sensors and a controller for calculating so that a structure thereof becomes complicated and a cost therefor or becomes expensive.

Still further, since the pressing force control of the hydraulic actuator is performed by an oil pressure, a control response of the pressing force is bad so that the variation of the torque is insufficiently reduce.

Furthermore, in a structure using a viscous fluid clutch or a magnetic fluid clutch, since the torque is transmitted through a fluid in both cases, a transmission response of the driving force is bad. When a fluid resistance is set great in order to improve the response, a reduction effect of the torque variation is deteriorated.

SUMMARY OF THE INVENTION

The present invention has been achieved with such points in mind.

It therefore is an object of the present invention to provide a transmission for an auxiliary device for transmitting a driving force of an engine to an auxiliary device through a planetary-gear-typed speed varying mechanism intermitted by a clutch, which can reduce a variation range of a transmission torque without frequently intermitting the clutch.

To achieve the object, according to a first aspect of the present invention, there is provided a transmission for an auxiliary device located between the auxiliary device and an engine, comprising: a speed varying mechanism having a first gear driven by the engine through an input shaft, a second gear connected to the auxiliary device and a third gear for being locking, the speed varying mechanism constructing a planetary gear; a stationary member isolated from the rotation of the speed varying mechanism; a friction clutch for connecting the third gear to the stationary member; a hydraulic actuator for pressing to engage the friction clutch; an oil pump for feeding an oil pressure to the hydraulic actuator, and a damper disposed between the stationary member and the friction clutch.

When the friction clutch is connected, the third gear is locked to the stationary member through the damper so that the driving force of the engine is transmitted to the auxiliary device by varying the speed through the planetary-gear-typed speed varying mechanism. Further, when the connection of the friction clutch is removed, the third gear is raced so that the auxiliary device is removed from the engine.

As mentioned above, in the above transmission for an auxiliary device, since the damper is arranged between the friction clutch and the stationary member, a peak torque is absorbed.

As in the above manner, since the variation range of the torque is reduced, a rattling noise of gear in the engaging portion of the gear and a slippage in the press fitting portion of the gear are prevented.

Further, since in the friction clutch, the slippage is prevented and a load due to the peak torque is reduced, a durability thereof is greatly improved. Together with this, since the peak load of the torque is reduced in the above manner and the variation range of the torque is reduced, it is possible to greatly miniaturize.

In addition to this, since it is unnecessary to frequently intermit the clutch for absorbing the peak torque as in the related art, an effect of improving the durability of the friction clutch is significantly increased.

Still further, as is different from the transmission for an auxiliary device in the related art, it is unnecessary to calculate by the various kinds of sensors and the controller so that the structure is simple and the cost is not expensive.

Furthermore, since the absorption of the peak torque is not performed by the intermission of the clutch, the bad response together with the hydraulic control of the clutch can be removed.

Moreover, the friction clutch is used as the clutch, in comparison with the conventional example using the viscous fluid clutch or the magnetic fluid clutch, the transmission response of the driving force is fast.

According to a second aspect of the present invention, as it depends from the first aspect, the oil pump is disposed between the input shaft of the first gear and the stationary member, the oil pump is driven by the input shaft.

The second aspect can obtain the same effect as that of the first aspect. In addition to this, since the oil pump is disposed between the input shaft of the first gear and the stationary member, the oil pressure is supplied to the hydraulic actuator by the shortest oil passage so that an operational response of the friction clutch is improved.

Further, since the oil pump is disposed at this position, the oil pump is united to the transmission for an auxiliary device so that a layout and a handling under assembling of the transmission for an auxiliary device and a control of the members and the products can be easily performed.

Still further, since the oil pump is assembled to the transmission for an auxiliary device, a structure for forcibly circulating respective lubricating portions is easily constructed and the durability is greatly improved.

According to a third aspect of the present invention, as it depends from the first or second aspect, the engine is a diesel engine.

The third aspect can obtain the same effect as that of the first aspect or the second aspect. In addition to this, in accordance with this structure which uses a diesel engine having a large variation of the torque, the reduction effect of the torque variation in accordance with the present invention is particularly great, the load of the friction clutch is reduced so that the durability of the friction clutch is greatly improved.

According to a fourth aspect of the present invention, as it depends from the first or the second aspect, the auxiliary device is a compressor compressing fluid.

The fourth aspect can obtain the same effect as that of the first aspect or the second aspect. In addition to this, in accordance with this structure, the contact or the jamming between a rotor of the compressor which is connected to an output shaft connected with the second gear and a casing of the compressor or the like as the stationary member, is prevented so that the durability of the compressor as the auxiliary device is greatly improved. This effect is considerable where the compressor works as a mechanical-typed supercharger.

According to a fifth aspect of the present invention, as it depends from the first aspect, the third gear is an internal gear of the planetary gear. The fifth aspect can obtain the same effect as that of the first aspect.

In addition to those features, since the friction clutch and the damper is provided between the internal gear and the stationary member, an effective diameter of the friction clutch can be set great and the variation range of the torque is enlargedly taken as an angle of rotation variation so as to finely control and reduce the variation range of the torque.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
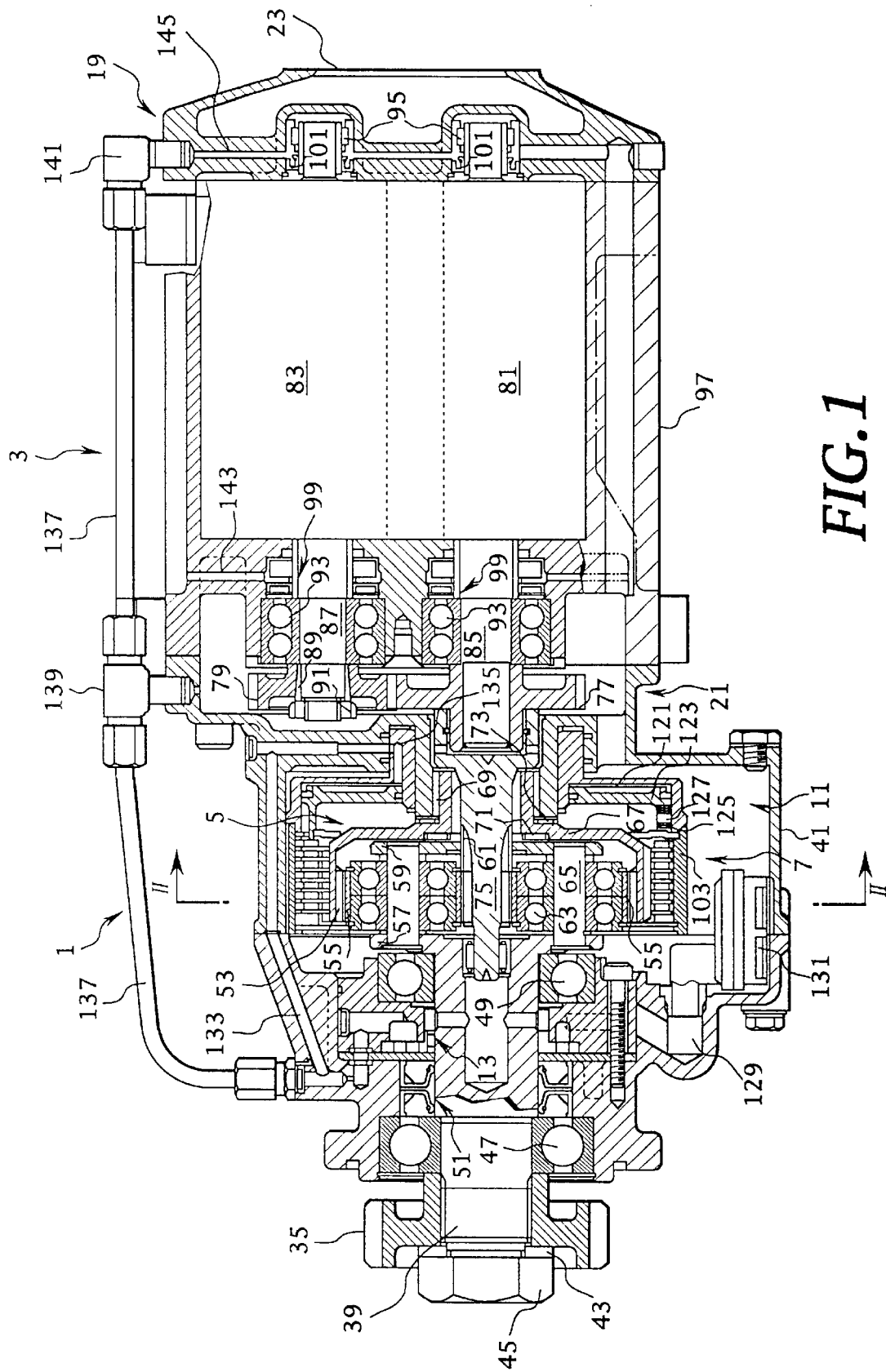
FIG. 1 is a cross sectional view showing an embodiment in accordance with the present invention.

There will be detailed below the preferred embodiments of the present invention with reference to the accompanying drawings. Like members are designated by like reference characters.

Figure 3:
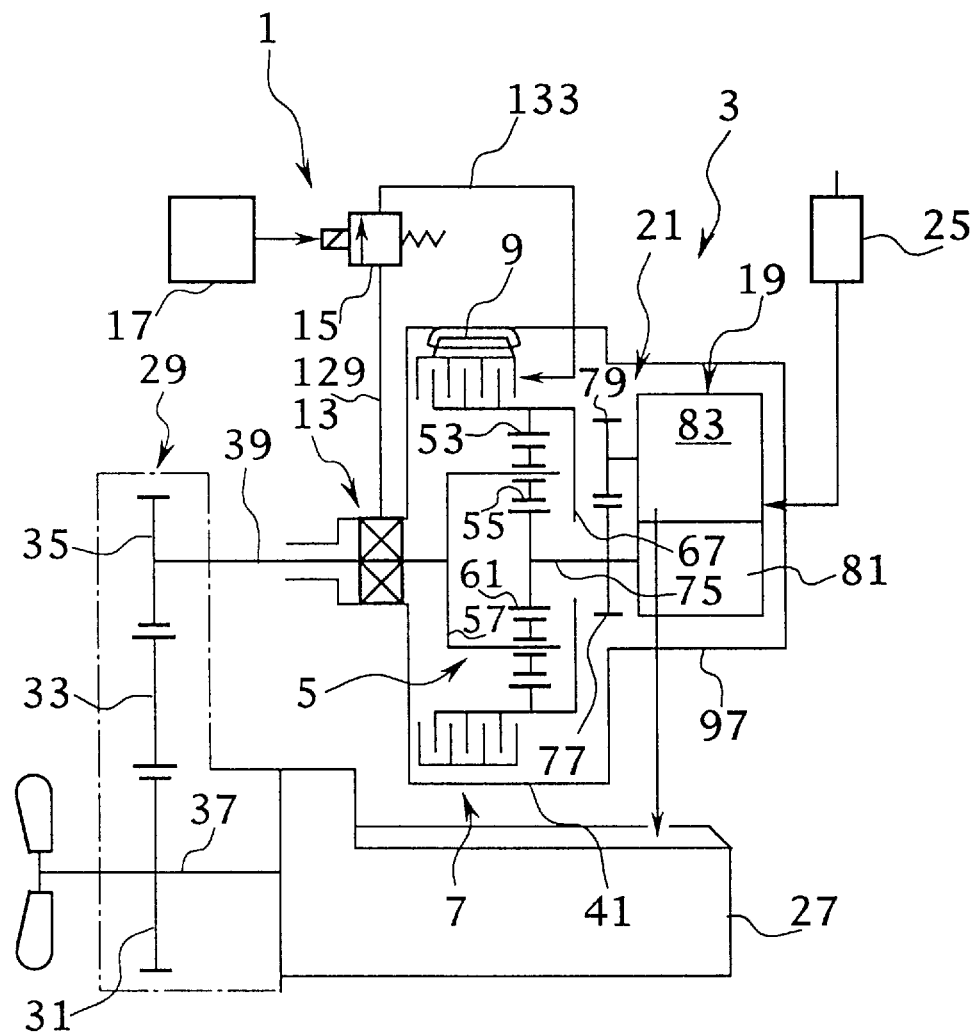
FIG. 3 is a skeleton diagram showing a supercharging system the embodiment of the invention.

The embodiment is provided with features of a lateral direction means a lateral direction in FIGS. 1 and 3.

As shown in FIG. 1, a transmission for an auxiliary device 1 in accordance with this embodiment is used for driving a supercharger 3 as the auxiliary device, namely a mechanical-typed supercharger.

As shown in FIGS. 1 and 3, the transmission for an auxiliary device 1 comprises a speed increasing mechanism 5 as speed varying mechanism which constructs a planetary gear, a multiple disc clutch 7 as a friction clutch, a damper 9, a hydraulic actuator 11, an oil pump 13, a solenoid valve 15, a controller 17 and the like.

Further, the supercharger 3 comprises a screw air compressor 19, a set of timing gears 21, a suction port 23, an air cleaner 25 and the like. An engine 27 is a diesel engine and a driving force thereof is transmitted to the transmission for an auxiliary device 1 through a gear transmission mechanism 29.

The gear transmission mechanism 29 comprises gears 31, 33 and 35, in which the gear 31 is connected to a crank shaft 37 of the engine 27, the gear 35 is connected to an input shaft 39 of the transmission for an auxiliary device 1 and the gear 33 is engaged with the gears 31 and 35.

The input shaft 39 extends through a casing 41 as a stationary member of the transmission for an auxiliary device 1 from a left end side and the gear 35 is connected to a front end of the input shaft 39 by a spline and is fixed by a washer 43 and a nut 45. The input shaft 39 is supported by the casing 41 through bearings 47 and 49 and seals 51 and 51 are disposed between the input shaft 39 and the casing 41 so as to prevent an oil leakage.

The speed increasing mechanism 5 comprises an internal gear 53 as a third gear, a pinion gear as a first gear, pinion carriers 57 and 59, a sun gear 61 as a second gear and the like.

Figure 2:
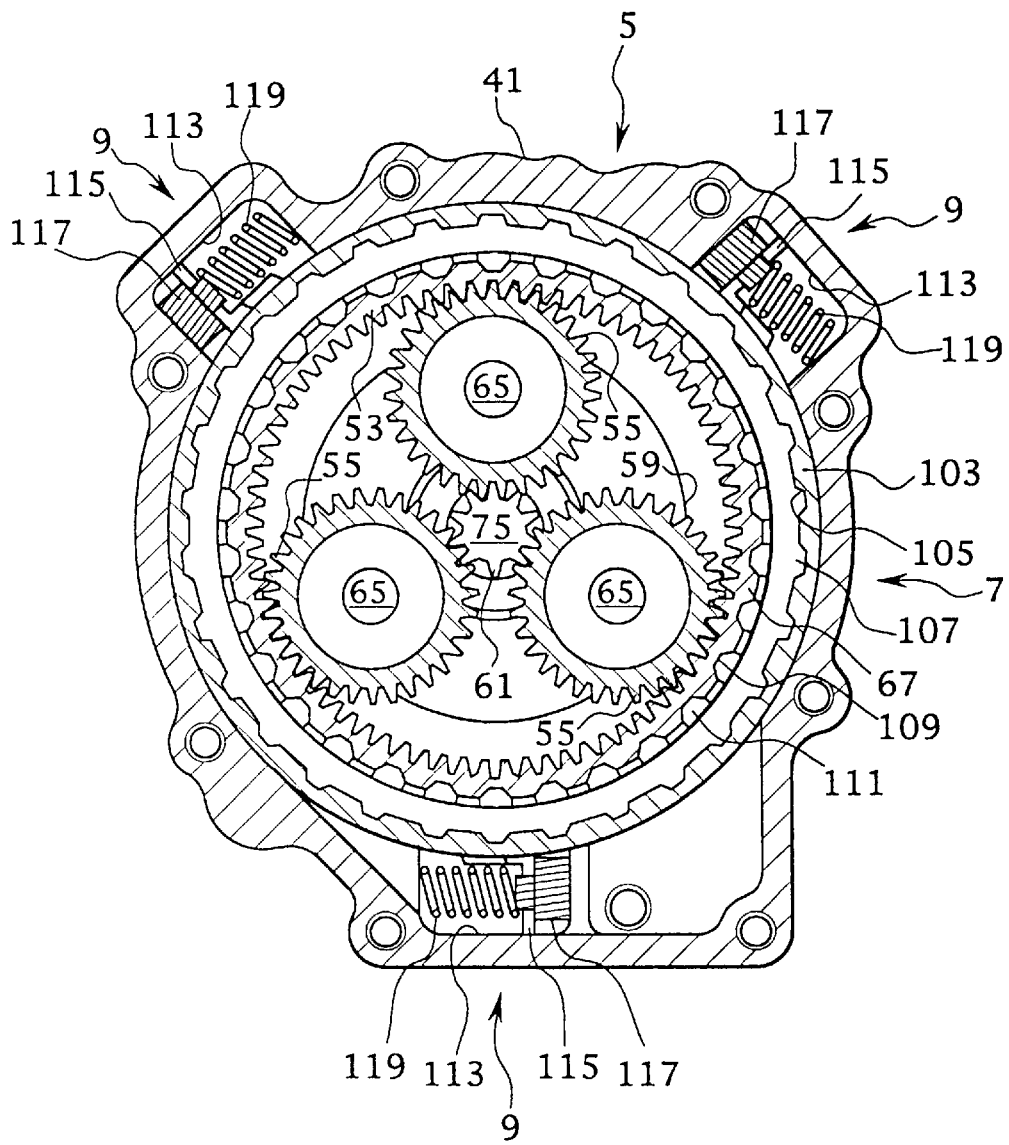
FIG. 2 is a cross sectional view taken along a line II—II in FIG. 1.

As shown in FIG. 2, three pinion gears 55 are disposed along a peripheral direction at an equal interval. Each of the pinion gears 55 is supported to a pinion shaft 65 by a bearing 63 and each of the pinion shafts 65 is supported to the right and left pinion carriers 57 and 59 at both ends. The pinion carriers 57 and 59 are connected to each other and the left pinion carrier 57 is integrally formed with the input shaft 39.

In accordance with the above structure, the driving force of the engine 27 is input to the pinion carriers 57 and 59 of the speed increasing mechanism 5 from the gear transmission mechanism 29 through the input shaft 39.

The internal gear 53 is formed on a hub 67 and the hub 67 is supported to an inner portion of the casing 41 through a plain bearing 69. A thrust bearing 71 is disposed between the hub 67 and the right pinion carrier 59 and a thrust bearing 73 is disposed between the hub 67 and the casing 41, thereby restricting an axial movement of the hub 67 so as to prevent an erroneous operation of the multiple disc clutch 7. Further, the sun gear 61 is formed on an output shaft 75 of the speed increasing mechanism 5.

The set of timing gears 21 of the supercharger 3 comprise a timing gear 77 having a large diameter and a timing gear 79 having a small diameter which are engaged with each other. Still further, as shown in FIG. 1, the air compressor 19 is provided with a pair of screw rotors 81 and 83.

The large diameter timing gear 77 is connected to the output shaft 75 by a spline and further is press fitted to a shaft 85 of the screw rotor 81. The small diameter timing gear 79 is positioned and fixed to a shaft 87 of the screw rotor 83 by a taper ring fixing mechanism 89 and a nut 91.

The respective shafts 85 and 87 of the screw rotors 81 and 83 are respectively supported to a compressor casing 97 by bearings 93 and 95 at a right end and a left end and an air leakage and an oil leakage are prevented by seals 99 and 101 mounted between both end portions of the shafts 85 and 87 and the compressor casing 97.

A rotation output from the speed increasing mechanism 5 is transmitted to the set of timing gears 21 through the output shaft 75, the set of timing gears 21 rotate the screw rotors 81 and 83 in such a manner as not to be in contact with each other and the driven air compressor 19 pressurizes the suction air sucked from the air cleaner 25 through the air inlet duct 23 so as to supply to the engine 27.

As shown in FIG. 2, the multiple disc clutch 7 comprises an outer clutch disc 107 engaging with a recess portion formed on an inner periphery of a clutch hub 103 and an inner clutch disc 111 engaging with a recess portion 109 formed on an outer periphery of the hub 67 having the internal gear 53, the outer clutch disc 107 and the inner clutch disc 111 which are alternately disposed.

Three housing spaces 113 are provided in the casing 41 along the peripheral direction at an equal intervals and an engaging member 115 extending through each of the housing spaces 113 is welded on the outer periphery of the clutch hub 103. A rubber 117 and a coil spring 119 are disposed between the engaging member 115 and the housing space 113, thereby constituting the damper 9.

As shown in FIG. 1, the hydraulic actuator 11 comprises a hydraulic cylinder 121 and a piston 123 and the hydraulic cylinder 121 is welded to the clutch hub 103 of the multiple disc clutch 7 and is rotatably supported to the casing 41. Further, a return spring 127 is disposed between a retainer 125 fixed to the clutch hub 103 and the piston 123.

The oil pump 13 is disposed between the input shaft 39 and the casing 41 and is driven by a rotation of the input shaft 39. The casing 41 is provided with an oil reservoir and the oil pump 13 sucks an oil within the oil reservoir from an oil passage 129 of the casing 41 through an oil strainer 131 and supplies a hydraulic operating fluid to the hydraulic actuator 11 from an oil passage 133 of the casing 41 through the solenoid valve 15 and further through an oil passage 135 of the hydraulic cylinder 121.

Further, the oil from the oil pump 13 is passed through an oil pipe 137 connected to an outer portion and is supplied to the bearings 93 and 95 of the respective screw rotors 81 and 83 from an oil plug 139 and 141 respectively through oil passages 143 and 145 of the compressor casing 97, thereby forcibly circulating these elements so as to return to the oil reservoir.

A signal concerning a rotation speed and a drive torque of the engine 27 is given to the controller 17 and the solenoid valve 15 is opened and closed on the basis of these signals. When the solenoid valve 15 is opened, the hydraulic operating fluid is supplied to the hydraulic actuator 11, and when the solenoid valve 15 is closed, the oil is returned to the oil reservoir so as to stop the supply of the hydraulic operating fluid.

When the hydraulic operating fluid is supplied to the hydraulic actuator 11, the piston 123 presses the multiple disc clutch to engage, and when the supply of the hydraulic operating fluid is stopped, the piston 123 is moved backward by the return spring 127 so that the multiple disc clutch 7 is opened.

When the multiple disc clutch 7 is engaged, the internal gear 53 is connected to the casing 41 through the multiple disc clutch 7 and the damper 9. When the rotation of the internal gear 53 is locked, the rotation of the input shaft 39 is increased by the speed increasing mechanism 5 and is transmitted to the set of timing gears 21 from the output shaft 75. On the other hand, when the multiple disc clutch 7 is opened, the internal gear 53 is in a state of free rotation and the supercharger 3 is removed from the engine 27 by the speed increasing mechanism.

The controller 17 stops supplying the oil pressure to the hydraulic actuator 11 as mentioned above so as to open the multiple disc clutch 7 and to remove the supercharger 3 from the engine when the supercharge is not required or when the rotation speed of the engine 27 is significantly increased so that the transmission torque is over a predetermined upper limit value during supercharging.

Since the damper 9 is disposed between the multiple disc clutch 7 and the casing 41, the damper 9 can absorb the peak torque applied to the speed increasing mechanism 5 and reduces the variation range of the torque.

In the above manner, the transmission for an auxiliary device 1 is structured. As mentioned above, in the transmission for an auxiliary device 1, since the variation range of the torque is reduced by the damper 9, the load applied to the clutch discs 107 and 111 of the multiple disc clutch 7 is reduced. Further, since it is structured such that the variation range of the torque is reduced by the damper 9, as is different from the conventional example, it is unnecessary to frequently intermit the multiple disc clutch 7 for absorbing the peak torque.

Accordingly, the durability of the multiple disc clutch 7 is greatly improved. Further, since the load is reduced in the above manner, the multiple disc clutch 7 can be miniaturized.

Still further, since the absorption of the peak torque is not performed by the intermission of the multiple disc clutch 7, the bad response due to the fluid control can be removed.

Furthermore, since the variation range of the torque is reduced, a contact between the screw rotors 81 and 83 and a contact between the rotors 81 and 83 and the compressor casing 97 can be prevented so that the durability of the air compressor 19 can be improved.

Moreover, since a calculation by the various kinds of sensors and the controller 17 is not necessary, the structure can be made simple and in a low cost.

Further, since the multiple disc clutch 7 is used, in comparison with the structure of the related art using the viscous fluid clutch or the magnetic fluid clutch, a transmission response of the drive force can be made fast.

Still further, the oil pump 13 is disposed between the input shaft 39 of the speed increasing mechanism 5 and the casing 41, the oil pressure can be supplied to the hydraulic actuator 11 by a shortest oil passage so that an operation response of the multiple disc clutch 7 can be improved.

Furthermore, the oil pump 13 is disposed at this position, the oil pump 13 and the transmission for an auxiliary device 1 are unitized so that a layout and a handling under assembling of the transmission for an auxiliary device 1 and a control of the elements and products can be easily performed.

Moreover, since the oil pump 13 is assembled to the transmission for an auxiliary device 1, a structure for supplying the oil pressure to each of the lubricating portions as the bearing 93 and 95 so as to forcibly circulate is easily made so that the durability thereof can be greatly improved.

In addition to this, in the structure using the diesel engine 27 which has a great variation of the torque, the reduction effect of the torque variation due to the arrangement of the damper 9 between the multiple disc clutch 7 and the casing 41 is particularly great so that as mentioned above, the durability of the multiple disc clutch 7 and the air compressor 19 is greatly improved.

In the transmission for an auxiliary device in accordance with the present invention, as is different from the above embodiment, the planetary-gear-typed speed increasing mechanism may be structured, for example, such that the drive force of the engine is input from the internal gear so as to lock the pinion carrier as the pinion gear. In this case, the damper is disposed between the pinion carrier and the casing.

Further, the friction clutch may be the other clutch than the multiple disc clutch. Still further, the engine is not limited to the diesel engine and the auxiliary device is not limited to the supercharger.

Furthermore, the auxiliary device is not limited to the supercharger for supercharging the engine, a compressor for compressing fluid or the like which is mounted in a cooling system, is applicable for the auxiliary device.

While preferred embodiments of the present invention have been described using specific terms, such description is for illustrative purposes, and it is to be understood that changes and variations may be made without departing from the spirit or scope of the following claims.

What is claimed is:

1. A transmission for an auxiliary device located between the auxiliary device and an engine, comprising:
   a speed varying mechanism having a first gear driven by the engine through an input shaft, a second gear connected to the auxiliary device and a third gear for being locking, the speed varying mechanism constructing a planetary gear;
   a stationary member isolated from the rotation of the speed varying mechanism;
   a friction clutch for connecting the third gear to the stationary member;
   a hydraulic actuator for pressing to engage the friction clutch;
   an oil pump for feeding an oil pressure to the hydraulic actuator; and
   a damper disposed between the stationary member and the friction clutch.

2. The transmission for an auxiliary device according to claim 1,
   wherein the oil pump is disposed between the input shaft of the first gear and the stationary member, the oil pump is driven by the input shaft.

3. The transmission for an auxiliary device according to claim 1,
   wherein the engine is a diesel engine.

4. The transmission for an auxiliary device according to claim 1,
   wherein the auxiliary device is a compressor compressing fluid.

5. The transmission for an auxiliary device according to claim 2,
   wherein the engine is a diesel engine.

6. The transmission for an auxiliary device according to claim 2,
   wherein the auxiliary device is a compressor compressing fluid.

7. The transmission for an auxiliary device according to claim 1,
   wherein the third gear is an internal gear of the planetary gear.

* * * * *